United States Patent [19]

Follett et al.

[11] Patent Number: 4,872,163

[45] Date of Patent: Oct. 3, 1989

[54] CONTENTION MECHANISM FOR COMMUNICATION NETWORKS

[75] Inventors: David R. Follett, Succasunna; Michael P. Levy, Hoboken, both of N.J.

[73] Assignees: American Telephone and Telegraph Company, New York, N.Y.; AT&T Bell Laboratories, Murray Hill, N.J.

[21] Appl. No.: 288,649

[22] Filed: Dec. 22, 1988

[51] Int. Cl.[4] ............................. H04J 3/24; H04J 3/02
[52] U.S. Cl. .................................. 370/94.1; 370/85.2; 340/825.5
[58] Field of Search .......................... 370/85, 94, 86; 340/825.5, 825.51

[56] References Cited

U.S. PATENT DOCUMENTS

| | | | |
|---|---|---|---|
| 4,491,947 | 1/1985 | Frank | 370/94 |
| 4,543,574 | 9/1985 | Takagi et al. | 340/825.5 |
| 4,584,678 | 4/1986 | Ozeki et al. | 370/85 |
| 4,593,282 | 6/1986 | Acampora et al. | 340/825.5 |
| 4,623,886 | 11/1986 | Livingston | 340/825.5 |
| 4,626,843 | 12/1986 | Szeto et al. | 340/825.5 |
| 4,630,264 | 12/1986 | Wah et al. | 370/85 |
| 4,642,630 | 2/1987 | Beckner et al. | 340/825.5 |
| 4,745,599 | 5/1988 | Raychaudhuri | 370/93 |

OTHER PUBLICATIONS

Weaver et al., IEEE Southeastcon '83, Apr. 11–14, 1983, Orlando, Florida, pp. 226–229.
Chu et al., IEEE Trans. Computers, vol. C–32, No. 8, Aug. 1983, pp. 763–766.
Fine, IEEE Trans. Computers, vol. C–33, No. 12, Dec. 1984, pp. 1130–1159.
Ulug, IEEE Jrnl. Sel. Areas Comm., vol. SAC-3, No. 6, Nov. 1985, pp. 908–915.
Dhadesugoor et al., Globecom '85, vol. 3, Dec. 1985, New Orleans, La., pp. 1306–1310.
Borrill, Microprocessors & Microsys., vol. 10, No. 2, Mar. 1986, pp. 94–100.

Primary Examiner—Robert L. Griffin
Assistant Examiner—Wellington Chin
Attorney, Agent, or Firm—Erwin W. Pfeifle

[57] ABSTRACT

A contention mechanism is disclosed for a communication network that provides perfect scheduling to avoid collisions between packets from a cluster of M circuit boards connected to a communications bus. The contention mechanism includes a 2-phase contention procedure comprising a first phase priority contention phase, where boards with a highest priority and a real data packet to transmit proceed into a second contention phase, where a pointer is used to declare one of the remaining priority phase circuit boards as the overall winner to transmit its packet during a subsequent packet period. When no circuit board has a packet to transmit, all M circuit boards are declared as winners of the first priority phase, and a board is declared the winner on a distributed basis to transmit a "dead-space" packet over the bus. The real and dead-space packets can also be encoded and/or include a parity bit to ensure signal transitions sufficient to maintain a duty cycle required by A-C coupled devices connected in the network and also provide fault isolation.

15 Claims, 5 Drawing Sheets

CONTENTION MECHANISM FOR COMMUNICATION NETWORKS

TECHNICAL FIELD

The present invention relates to a contention mechanism for a communication network that provides perfect scheduling to avoid collisions between transmitted packets and can also be used with non point-to-point AC-coupled applications.

DESCRIPTION OF THE PRIOR ART

Presently, communication systems, such as Local Area Networks (LANs), include various configurations that connect two or more devices, such as transceivers which use the same frequency band, to a single bus over which Time Division Multiplexled (TDM) signals from the devices are transmitted. With such configurations, it is possible for two or more of the devices to concurrently transmit over the same one-way TDM channel. When concurrent transmissions occur on the TDM channel, the signals collide and recovery of the individual signals becomes impossible.

Various contention and resolving techniques have been devised to permit transceivers to (1) detect when a collision has occurred between two or more signals over the single one-way channel and (2) resolve the collision. One such technique is disclosed in U.S. Pat. No. 4,543,574 issued to A. Takagi et al. on Sept. 24, 1985. There, a contention phase is initiated to detect a collision in a particular direction of transmission along the channel, and once a collision is detected by a receiver coupled to he channel, a resolution phase is initiated. In the resolution phase, all nodes stop to discriminate their positions during a predetermined time period, and the leftmost or rightmost node, depending on the direction of transmission, that was involved in the collision retransmits its packet while the remaining nodes involved in the collision reserve a separate sequential packet transmission time. Once all of the colliding nodes have retransmitted their packets, the resolution phase is complete and the system returns to normal transmissions with the contention phase. Another two-phase technique for a random access communication system is disclosed in U.S. Pat. No. 4,745,599 issued tot D. Raychaudhuri on May 17, 1988.

A contention based channel reesrvation technique is disclosed in the article by W. W. Chu et al. in IEEE Transactions On Computers, Vol. C-32, No. 8, Aug. 8, 1983 at pages 763-766, wherein a frame format is used that consists of a reservation subframe and a data subframe. The reservation subframe comprises reservation slots, each of which is able to carry reservation requests using the slotted ALOHA protocol. If a reservation request does not collide, it is considered successful and a distributed scheduling algorithm is executed at each node to schedule its packet transmission. Other distributed demand assignment multiple access (DAMA) packet transmission techniques with contention is disclosed, for example, in the article by M. Fine in IEEE Transactions on Computers, Vol. C-33, No. 12, December 1984 at pages 1130-1139, which include techniques such as the Schedule Delay Access Mechanism, the Reservation Access Mechanism, and the Attempt-and-Defer Access Mechanism.

In addition to LANS, prior art transmission techniques also include the various well-known 32-bit backplane bus architectures such as, for example, the asynchronous VMEbus standard and the synchronous Multibus II standard which use arbitration techniques for transmitting messages over the bus. These and other backplane bus standards are extensively discussed in the article by P. L. Borrill in *Microprocessors and Microsystems*, Vol. 10, No. 2, March 1986, at pages 94-100.

In the prior art systems, a signal will be found on the bus when a node or device transmits a packet, and during packet periods when no node or device has a packet to transmit the bus will be quiet. Secondarily, A-C coupled devices, such as repeater receivers, etc., require some signal pattern at all times in order to see transitions for maintaining a reasonable duty cycle, and a system with a lack of some continuous signal with transitions would vary the duty cycle received by the A-C coupled devices and create problems in the system.

The problem remaining in the prior art is to provide a contention mechanism which will avoid collisions on a common bus and provide perfect scheduling so that the devices connected to the bus do not have to listen for collisions or retransmit packet because of collisions. Secondarily, a problem in the prior art is to provide a contention mechanism that can also be used with A-C coupled applications, that allows for fault isolation and identification, and has bounded worst-case bus access delays.

SUMMARY OF THE INVENTION

The foregoing problem in the prior art has been solved in accordance with the present invention which relates to a contention mechanism for a communication network that provides perfect scheduling of packets of information over a bus to avoid collisions between transmitted packets, and which also can be used with non point-to-point AC-coupled devices, allows for fault isolation and identification, and has bounded worst-case bus access delays. More particularly, the present contention mechanism functions to dynamically determine which packet is to be sent in a packet transmission period over the system during a prior packet transmission period using a two-phase contention procedure. In the first contention phase, the contention mechanism determines which one or more of the devices (1) have a packet to transmit, and (2) also have a highest priority in a distributed manner. Such devices declare themselves as the winners of the first priority contention phase and continue on to the second contention phase while all other devices contend again during the next packet transmission period. The winners of the first priority contention phase enter the second contention phase where one of these devices is chosen on a distributed basis, based on the location of a cyclically incremented pointer, as the second contention phase winner. If the device being momentarily pointed to during a second contention phase period is not one of the one or more priority winners of the first contention phase or is not installed, then another device nearest it in a predetermined direction along the bus would be declared the winner and be enabled to send its packet in the next packet transmission period to all devices. When no devices are found to have "real data" to send during a first contention phase, then all devices are effectively declared the winner, and the device pointed to during the second contention phase, or the nearest device in a predetermined direction when the pointed to device is not installed, declares itself the winner, and this device transmits a "dead space" signal packet during the next packet transmission period to all devices. Each of the "real data" and "dead space" signal packets are arranged to have sufficient transitions and an average power level in the transmitted real or dead space packet signal to maintain a duty cycle required by an A-C coupled device coupled to the bus.

Other and further aspects of the present invention will become apparent during the course of the following description and by reference to the accompanying drawings.

DETAILED DESCRIPTION

Figure 1:
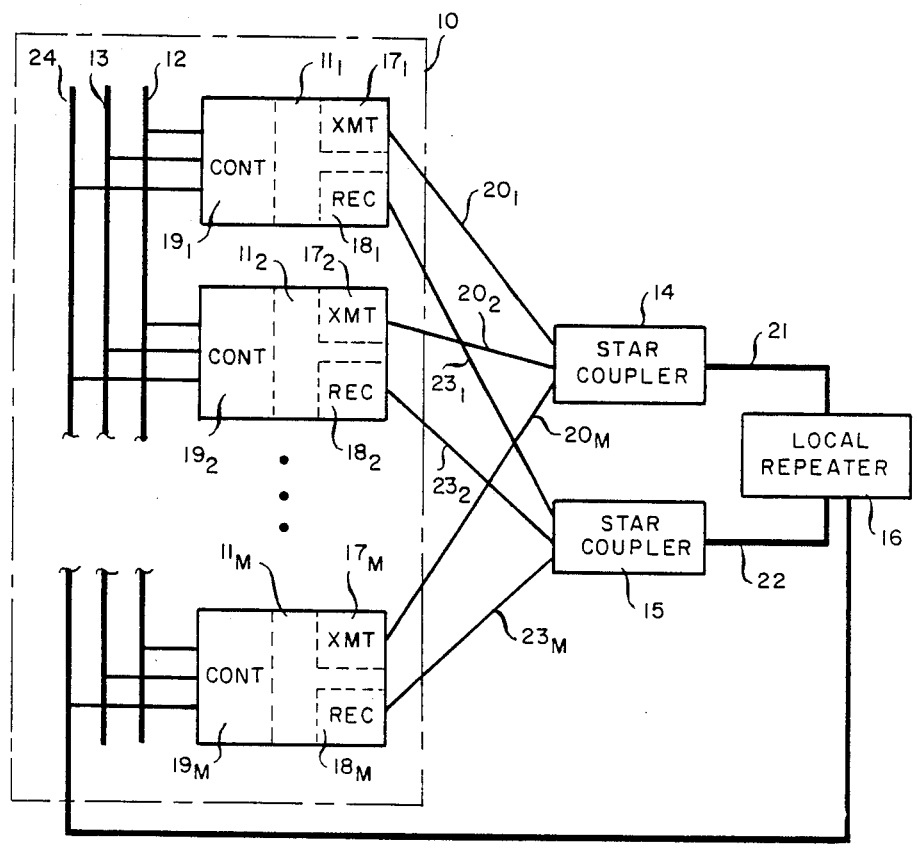
FIG. 1 is a block diagram of a star-configured communication system or network with a single cluster of circuit boards that can be used to implement the present contention mechanism.

FIG. 1 illustrates a simple star-configured communication system or network that can be used for implementing the present contention mechanism. It is to be understood that the communication system or network depicted in FIG. 1 is for purposes of illustration only and nor for purposes of limitation, and that other suitable electrical or optical configured communication systems or networks could be substituted and still use the concept of the present contention mechanism.

In FIG. 1, the exemplary communication system or network comprises a cluster 10 of a plurality of M devices $11_1$ to $11_M$ which are separately connected to a priority bus 12, a contending bus 13, and a pointer bus 24 and will be designated hereinafter, for descriptive purposes only, as circuit boards $11_1$ to $11_M$. The network further comprises a first and a second star coupler means designated 14 and 15, respectively, and a local repeater 16. Each circuit board $11_i$ comprises a separate electrical or optical transmitter $17_i$; a separate electrical or optical receiver $18_i$; and a separate contention circuit $19_i$, which forms part of the present contention mechanism that will be described after the following description of the overall system or network of FIGS. 1 and 2.

Each of transmitters $17_i$ is connected to a separate one or more input ports of a first star coupler means 14 via a separate respective group of one or more leads or optical fibers $20_i$, where the number of leads or optical fibers is determined by the number of separate signals needed to transmit a packet of information using the appropriate protocol. For example, for digital transmission, if a 16 bit packet is to be transmitted in parallel, then 16 leads or optical fibers would be necessary for each of transmit busses $20_i$ and each lead would be connected to a separate input port of a separate one of 16 star couplers 14. For serial transmissions at the 16-bit packet, only one lead would be necessary for each of transmit busses $20_i$, which one lead would be connected to a separate input port of one star coupler means 14.

Star coupler means 14 combines the concurrent signals received at its input ports from circuit boards $11_1$ to $11_M$ of cluster 10 into a single output signal on transmit bus 21. For the above exemplary case of 16 parallel bits, each of the corresponding bits in the one or more received signals would be combined and provided as a separate output bit signal on a separate lead of transmit bus 21. Similarly, for the exemplary serial transmission, any bit signals concurrently received at any one or more of the input ports of star coupler means 14 from circuit boards $11_1$ to $11_M$ during each of the sequential bit times would be combined and transmitted over transmit bus 21 during that time slot. The signals on transmit bus 21 are delivered to a local repeater 16 which, inter alia, regenerates the input signals from transmit bus 21 and retransmits the regenerated signals back to a second star coupler means 15 via a receive bus 22. Second star coupler means 15 then divides the individual input signals from local repeater 16 into a plurality of M separate portions, and transmits each portion back to a separate one of receivers $18_1$ to $18_M$ of circuit boards $11_1$ to $11_M$, respectively, via a respective group of one or more leads or optical fibers $23_1$ to $23_M$.

Figure 2:
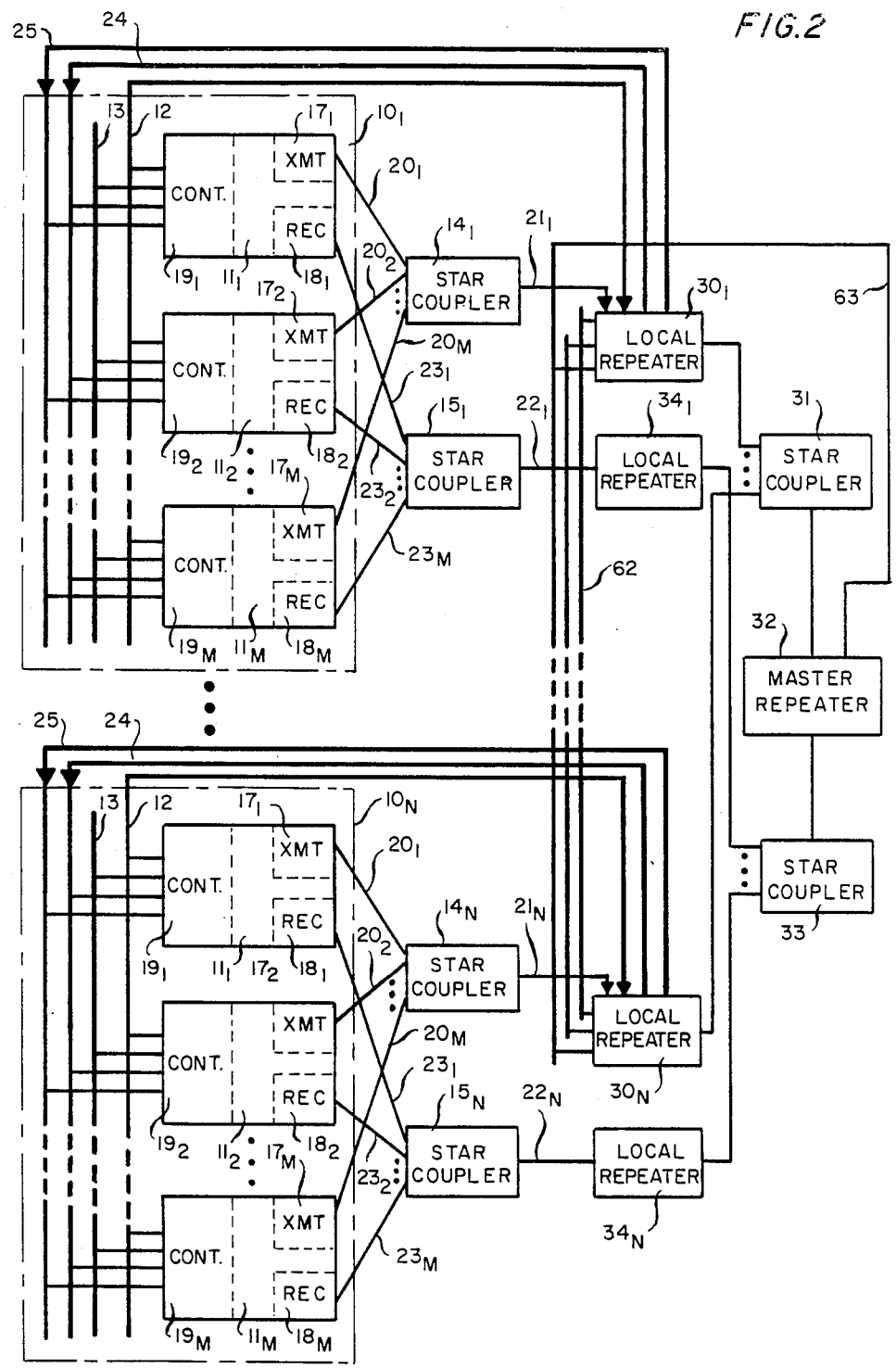
FIG. 2 is a block diagram of a plurality of separate starconfigured systems or networks shown in FIG. 1 which are connected in an overall star-configured communication system that can be used to implement the present contention mechanism.

FIG. 2 illustrates an expanded two-tier star-type communication system or network which has a configuration that uses a plurality of N clusters $10_1$ to $10_N$, each of which include the structure shown in FIG. 1. Each of clusters $10_1$ to $10_N$ comprises a separate plurality of M circuit boards $11_1$ to $11_M$, where each circuit board of each cluster $10_j$ includes a transmitter $17_i$ coupled by a bus $20_i$ to a first star coupler means $14_j$; a receiver $1_i$ coupled to a second star coupler means $15_j$; and a contention circuit $19_i$ coupled to the priority bus 12, the contention bus 13, the pointer bus 24, and a 1-bit control bus 25 in associated cluster $10_j$ in the manner shown, in part, in FIG. 1. Each of first star couplers means $14_1$ to $14_N$ are coupled via busses $21_1$ to $21_N$, respectively, to respective local repeaters $30_1$ to $30_N$. Each of local repeaters $30_1$ to $30_N$ function in the manner of local repeater 16 of FIG. 1 to, inter alia, regenerate the signal received on associated bus $21_j$ and send the regenerated signal to a separate input port of a third star coupler means 31, after contention between the local repeaters has been resolved, in a distributed manner comparable to that for the circuit boards of each cluster, as will be described hereinafter. Third star coupler means 31 combines any concurrent signals from local repeaters $30_1$ to $30_N$ into a single output signal which is transmitted to a master repeater 32.

Master repeater 32 regenerates and amplifies the received signal from third star coupler means 31 and transmits the regenerated signal to fourth star coupler means 33. Fourth star coupler means 33 divides the signal from master repeater 32 into N substantially equal portions for distribution to a plurality of N second local repeaters $34_1$ to $34_N$ which are associated with clusters $10_1$ to $10_N$, respectively. Each of second local repeaters $34_1$ to $34_N$ regenerates its received portion of the master repeater output signal and transmits its regenerated output signal to the associated corresponding one of second star couplers means $15_1$ to $15_N$. Second star coupler means $15_1$ to $15_N$ each function as described for second star coupler means 15 of FIG. 1 to divide and distribute the received signal to each of the M circuit boards $11_1$ to $11_M$ of the associated cluster $10_j$.

Contention in accordance with the present invention is basically a two-phase technique which is preferably performed electrically via separate electrical contention buses 12, 13 and 24. However, it is to be understood that the present contention technique could also be performed optically. In accordance with an exemplary embodiment of the present contention mechanism, during a normal packet period, priority contention is performed in a first phase of contention in each cluster 10 as shown in the exemplary sequence of FIG. 5. During the cluster priority contention phase 50, the one or more circuit boards $11_i$ within each cluster of FIGS. 1 and 2 that have a packet of information ready to transmit, also called "real" data, and also have the highest priority of those circuit boards ready to transmit, declare themselves as the winners of this first priority phase on a distributed basis. The other, or losing, circuit boards of the cluster 10 drop out of further contention during the remainder of the 2-phase contention technique and contend again during the next packet transmission period. More particularly, for an exemplary 4-level priority assignment, exemplary 2-bit priority codes that can be used would be 00, 01, 10, and 11, where code 00 is, for example, considered the lowest priority. Each of circuit boards $11_i$ to $11_M$ would selectively be assigned one of these priority codes which would be stored, for example, in a memory (not shown) in the contention circuit $19_i$ of that board $11_i$.

Figure 3:
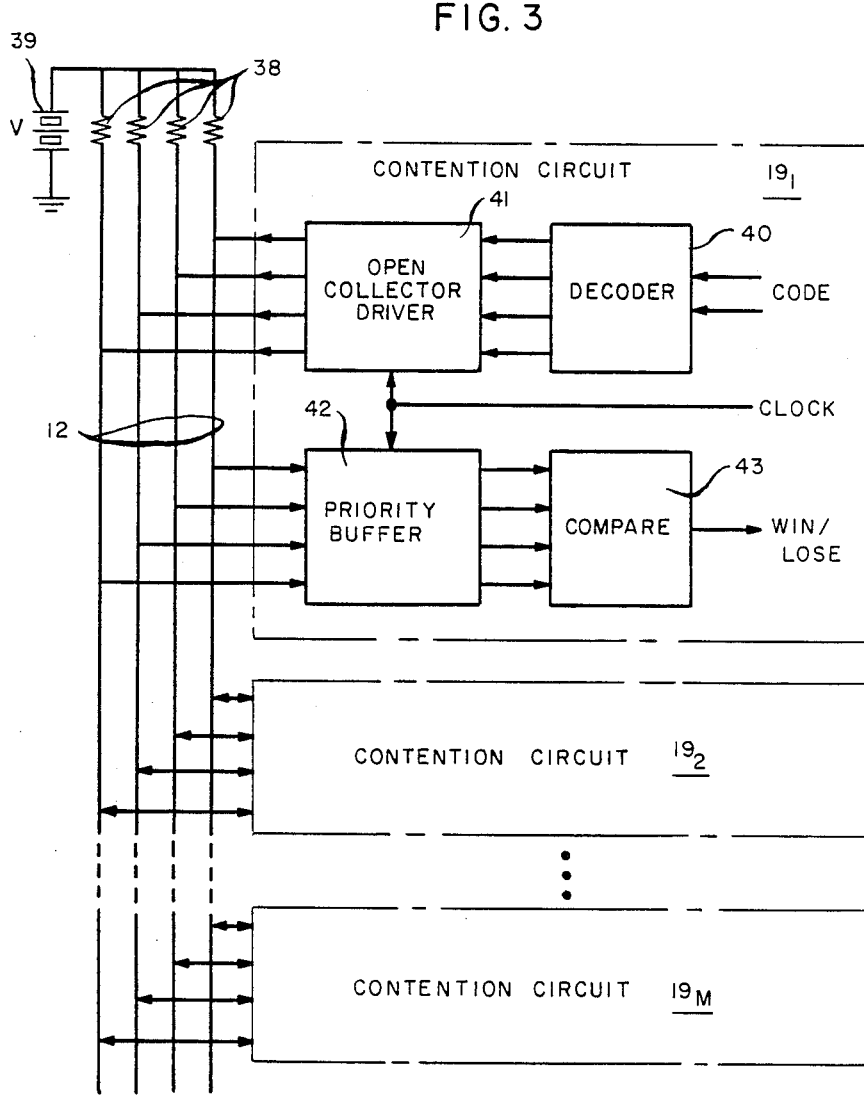
FIG. 3 is a block diagram of the M contention circuits of a cluster of circuit boards that are connected to a first phase priority contention bus in either one of the arrangements of FIGS. 1 or 2, with one of the contention circuits being expanded to show an exemplary block diagram thereof.

FIG. 3 is an exemplary arrangement for contention circuits $19_1$ to $19_M$ in a cluster 10 of FIG. 1, or in each cluster $10_j$ of FIG. 2, for performing the first cluster priority contention phase 50 associated with priority bus 12. For purposes of discussion of the exemplary contention mechanism, only contention circuit $19_1$ has been expanded in FIG. 3 to show exemplary components for performing the priority contention. As shown in FIG. 3, during a first priority phase for a cluster 10 of circuit boards $11_1$ to $11_M$, a decoder 40 in each contention circuit $19_1$ to $19_M$ takes the 2-bit priority code assigned to its circuit board, and translates that exemplary 2-bit code into an exemplary 4-bit code. For example, typical 2-bit to 4-bit translations that can be made are: 00=0001; 01=0010; 10=0100 and 11=1000 so that a high bit, "1", is in a separate bit location for each 4-bit code. It is to be understood that the 4-bit priority code could be stored directly in a memory (not shown) in the contention circuit $19_i$ thereby avoiding the need for decoder 40. The 4-bit priority code is then transmitted by an exemplary associated open collector driver (OCD) 41, which is well known in the art, to the corresponding leads of an exemplary 4-wire priority bus 12. The bus data leads are driven with open collector gates (not shown) in drivers 41, and logic "1" values are represented by zero potential. Each bit of the 4-bit code drives a separate lead 12 through a separate resistor 38 to a potential source 39. Thus, as is well known, the value on the bus 12 is the OR of the values placed by there by the devices 19 driving the bus.

Assuming that each of three circuit boards 11 have a packet of data to transmit during a first cluster priority contention phase, and a first circuit board has a 4-bit priority code of 1000, a second circuit board has a 4-bit priority code of 0100, and a third circuit board has a 4-bit priority code of 1000. Then, the concurrent appearance of these three 4-bit priority codes on the 4 corresponding leads of priority bus 12 causes each of the bus leads to act as an individual OR gate that produces a resultant 4-bit bus code of 1100 which is received and stored in a priority buffer 42 in each contention circuit $19_i$. A comparator 43 in each contention circuit $19_i$ receives the stored 4-bit bus code from associated buffer 42 and compares this 4-bit code with the code of the circuit board to determine whether the most significant "1" in the stored code corresponds to the most significant "1" in the 4-bit priority code associated with its circuit board $11_i$. If it does, the circuit board declares itself as a "winner" of the first cluster priority contention phase and a "win" signal is generated as an output of comparator 43. In the above example, the first and third circuit boards would declare themselves as winners. If the most significant "1" of the stored code in buffer 42 does not correspond to the most significant "1" in the priority code of the circuit board, then comparator 43 generates a "lose" signal, and the circuit board drops out of the present cluster contention procedure and contends again during the next packet cycle for the transmission of its packet.

Figure 4:
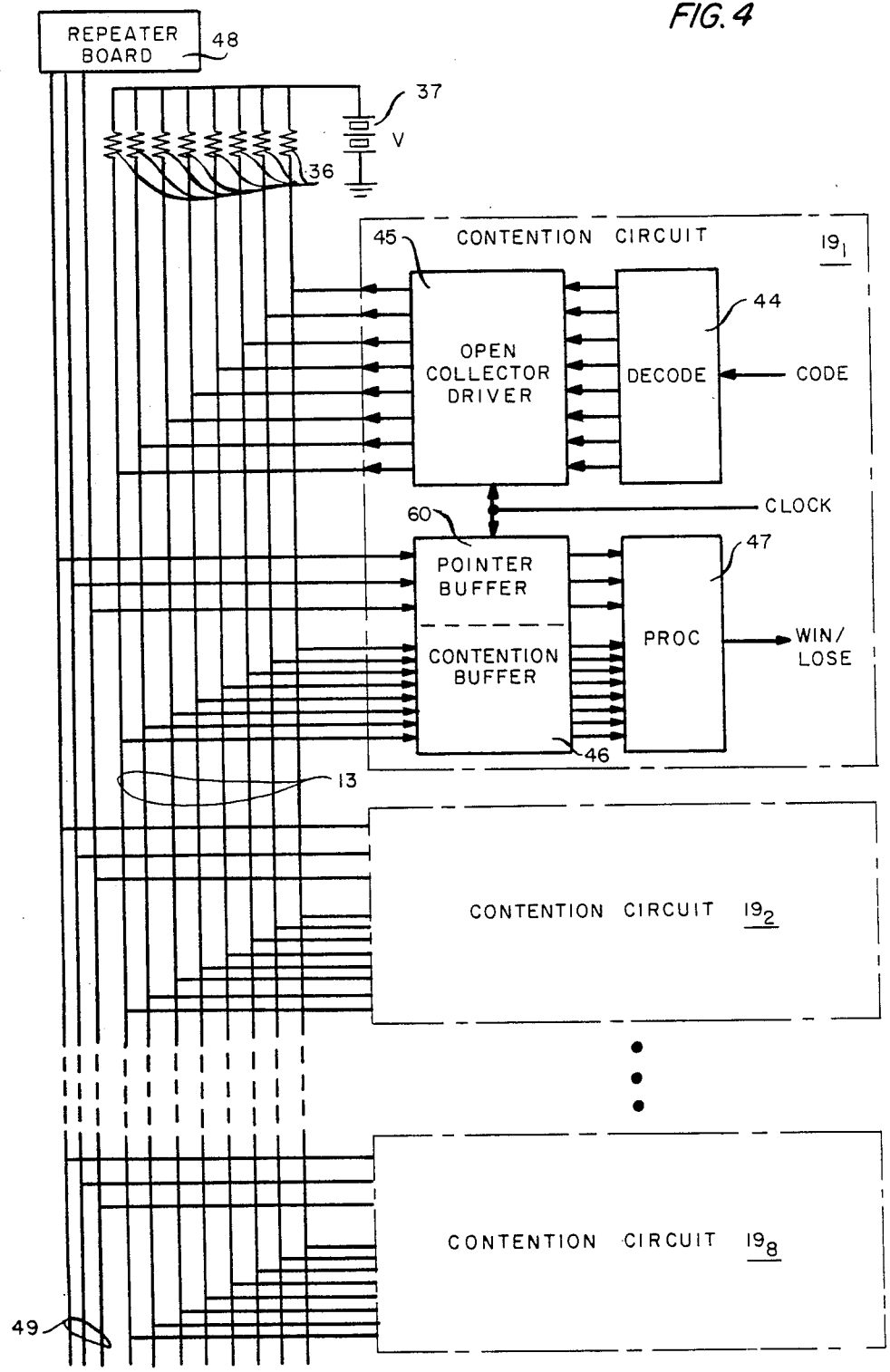
FIG. 4 is a block diagram of the M contention circuits of a cluster of circuit boards that are connected to a second phase contention bus in either one the arrangements of FIGS. 1 or 2, with one of the contention circuits being expanded to shown an exemplary block diagram thereof.
Figure 5:
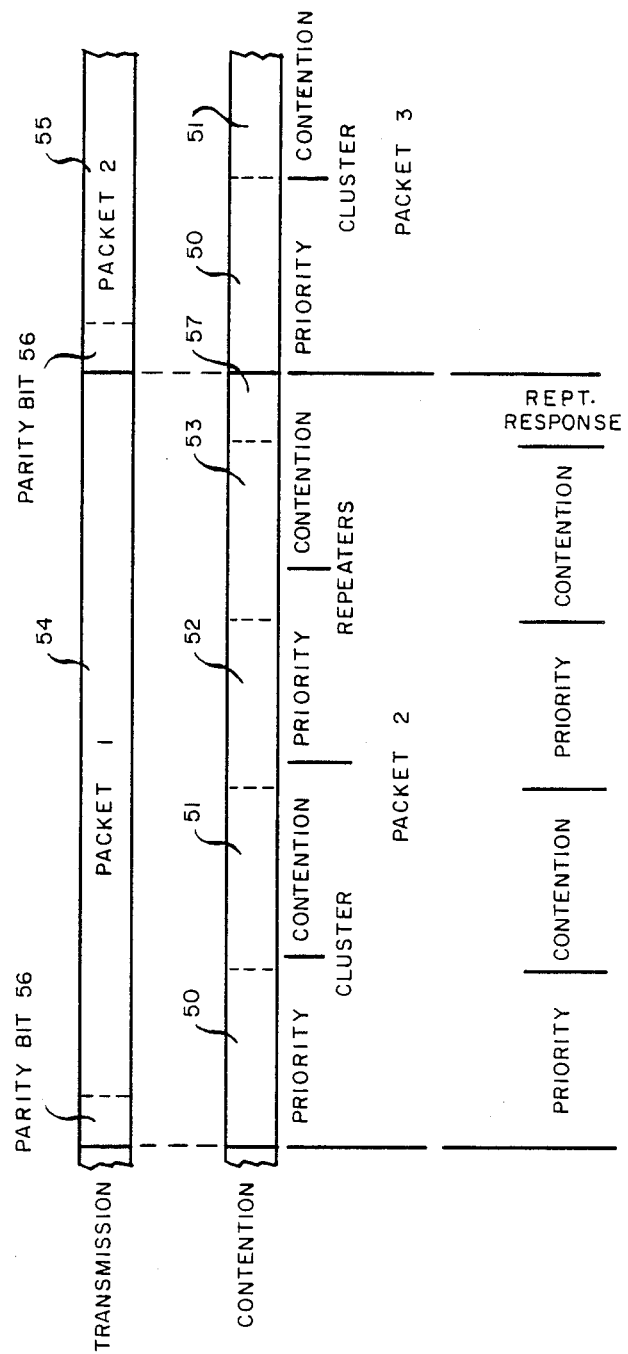
FIG. 5 is a time sequence diagram of an exemplary packet transmission and contention sequence for use in either one of the arrangements of FIGS. 1–4.

During a second cluster contention phase corresponding to time period 51 of FIG. 5, only the circuit boards $11_i$ in a cluster 10 that survived, or declared themselves as a "winner" in the first priority phase, enter the second contention phase. Typical circuitry for such phase is shown in FIG. 4 where, for purposes of explanation, a cluster 10 will be considered to have only 8 circuit boards $11_1$ to $11_8$, in which case contention bus 13 will have an exemplary 8 leads, corresponding to the number of circuit boards 19 in a cluster, with each lead terminating through a separate resistor 36 to a voltage source 37. To compete in the second contention phase, each circuit board $11_1$ to $11_8$ is numbered from 0-7 in sequence, and that number is stored in a memory (not shown) in associated contention circuit $19_i$. A decoder 44 converts the assigned number into a corresponding 8-bit code that has, for example, a "1" only in the bit position corresponding to the designated number of the circuit board. It is to be understood that the 8-bit code could be stored in a memory for direct availability and thereby avoid the need for decoder 44.

More particularly, first circuit board $11_o$ in the sequence would be assigned the sequence code 0 and decoder 44 would produce a translated number of 00000001, where the "1", or high bit, is disposed only in the least significant bit position. Similarly circuit board $11_1$ and $11_7$ would have an 8-bit sequence code of 00000010 and 10000000, respectively since these respective two boards are the second and highest numbered board in the sequence.

During the second cluster contention phase, designated 51 in FIG. 5, each of the circuit boards 19 which declared themselves as winners in the first priority phase, would transmit via an open collector drive 45, their 8-bit sequence code onto corresponding wires of the exemplary 8-lead contention bus 13 with logic "1" values represented by zero potential. The transmission of the 8-bit code effectively raises a flag or pointer (the "1" in a certain position) on the associated lead of contention bus 13 that this circuit board $11_i$ is still contending, and the 8-bit values on bus 13 are stored in a contention buffer 46 so that each board knows who is still contending. During the sequential packet periods, a different circuit board is "pointed to" during the second cluster contention phase in each packet period, with the pointer being cyclially incremented during each packet period. It is to be understood that the pointer can be positioned using various algorithms depending on specific implementations, and that cyclical incrementation is one such algorithm. More particularly, with the exemplary 8 circuit boards (0-7) per cluster 10, during a first packet period 54 shown in FIG. 5, the flag or pointer, stored in a board 48 of repeater 16, would be initialized to a number 0. The number "0" would then be converted in board 48 to a 3-bit code and transmitted over a 3-bit bus 49 to all contention circuits 19 for storage in a pointer buffer 60. Circuit board 0 would see that this 3-bit code matches its number and declare itself the winner of this second cluster contention phase if it has a packet to transmit and is still contending after the first cluster priority phase. During the second packet period 55, the flag or pointer would be incremented to the number 1, and similarly circuit board 1 would declare itself as the winner of the second cluster contention phase during this packet period, if it has a packet to transmit and is still contending after the first cluster priority phase. Each contending circuit board 10 has sufficient information at this time from the 3-bit pointer bus and the 8-bit contention bus to determine which board is the winner of the second cluster contention phase 51. If the circuit board being pointed to has raised its flag on the assigned lead of 8-bit contention bus 13 during the second cluster contention phase 51, it will determine itself as the winner. Alternatively, if the circuit board being pointed to does not raise a flag on its assigned lead of contention bus 13 during the second cluster contention phase 51, then a circuit board nearest the circuit board on a predetermined side of the pointed to circuit board would declare itself the winner. All losing boards during the second contention phase would again being the 2-phase cluster contention process during the next packet cycle with all other circuit boards. For the condition where no circuit board was found to have before, all 8 circuit boards would be declared as winners of the first cluster priority contention phase and proceed into the second cluster contention phase 51 where the circuit board being pointed to during that packet period would declare itself the winner of the 2-phase cluster contention process, if that board is present or the nearest board thereto if that board is not installed or functioning, and transmit a predetermined "dead space" packet during the next packet period to star coupler 14 associated with that cluster 10. The real or dead space packet is then received in FIG. 1 by local repeater 16, which retransmits the packet to star coupler 15 and back to all of the circuit boards of cluster 10.

For a two-tiered network as shown in FIG. 2, each of the clusters 10 first perform a 2-phase contention process and then the N local repeaters $30_1$ and $30_N$ contend by perform a same 2-phase contention process during a first local repeater priority contention phase 52 and a second local repeater contention phase 53 shown in FIG. 5. It is to be understood that a similar arrangement for performing the first phase priority and second phase contention procedures as shown in the exemplary arrangements of FIGS. 3 and 4 would be used between repeaters 30. More particularly, each local repeater 30hd j becomes involved with the first local repeater priority contention phase via a repeater priority bus 62. In the manner described for the previous cluster priority contention phase 50, the one or more local repeaters 30 look at the priority code on cluster priority bus 12 to determine the priority of the winning circuit board 10 of the associated cluster, and perform the repeater priority phase 53, and the repeaters with the highest priority received from the clusters, will declare themselves as the winners of the local repeater priority contention phase 52, and proceed to the second local repeater contention phase 53. Each local repeater 30 that declares itself as a winner in the first local repeater priority contention phase 52, enters the second local repeater contention phase 53 where a cyclial pointer, provided by a master repeater 32 via a pointer bus 63, permits one of the local repeaters 30 to declare itself as the winner using a process as outlined for the second cluster contention phase. The winning cluster circuit board is notified by the winning local repeater 30 via 1-bit bus 25 to send its packet during a next packet period. All other local repeaters 30 are declared as losers and notify the previously declared winning circuit board $11_i$ via a 1-bit bus 24, during repeater response period 57 in the associated cluster $10_j$, that the real packet will not be sent, to send a "dead space" packet instead, and to contend again during the next packet period. The "dead space" packet is sent because of the AC coupled device requirements at each local repeater 30. As before, if no local repeater 30 has a real data packet to regenerate, then all of the local repeaters are declared winners in the first local repeater priority contention phase, and one of the local repeaters 30 is declared the winner using the cyclical pointer during the second local repeater contention phase 53 and regenerates its received dead space packet to star coupler 31 and master repeater 32.

With A-C coupled devices, such as main repeater 32, a reasonable duty cycle needs to be kept to avoid distortions in the output of the device. To maintain such reasonable duty cycle, a data signal pattern with transitions therein is continuously needed. Real data packets tend to have sufficient transitions and an average power level, but periods where no data packet is being sent would gradually reduce the duty cycle of the A-C coupled device. By sending a dead space data packet in normal quite periods, the duty cycle required by the A-C coupled devices can be maintained, provided the dead space pattern does not just comprise all "0's" or all "1's" since that would not provide sufficient transitions and an average power level to maintain a reasonable duty cycle of the A-C coupled device. Suitable patterns can preferably be obtained by using a suitable scrambling or coding technique.

An exemplary suitable scrambling or coding process would be to invert every other bit in a packet which should also be provided for real data packets since real data or dead space data with all "0's" would emerge as alternating 0's and 1's. For example a packet with the data of 0000000000 would be encoded into 0101010101, and a packet with the data 0011111100 would be encoded into 0110101001. It is also preferred that a parity bit 56 be included with the encoded packet so that if the word contains all 0s or 1s, the word does not have all 0s or 1s since the parity bit 56 avoids it. Such parity bit 56 would be added after the scrambling or encoding process. It is to be understood that a dead space packet can also be originally sent by the circuit board $11_i$ with a predefined pattern of 0's and 1's and a valid parity bit 56 so that a dead space packet does not have to go through the scrambling and encoding procedure. The parity bit 56 can then be used at the receivers $18_i$ of circuit boards $11_i$ in each cluster for error checking purposes. If an error is detected at a circuit board, this can be communicated either electrically or optically to a central processor (not shown) where a determination can be made as to whether that circuit board $11_i$ or a local repeater $30_j$ is defective or not, depending on signals communicated to the central processor from other circuit boards. In other words the parity bit 56 will help in fault isolation of components in the network or system.

The present contention mechanism provides perfect scheduling since only one circuit board throughout the system is enabled to send a packet during any single packet period, and all packet periods can be utilized. Such perfect scheduling is accomplished by performing the 2-phase contention process during a prior packet transmission period to schedule a packet of information so that no two packets are transmitted concurrently during a packet transmission period. It is understood that the contention procedure could be performed in any prior packet period, or in separate packet periods for each of the cluster and repeater priority and contention phases, and that it is also possible to overlap the second cluster contention phase 51 and the first repeater priority contention phase 52 instead of using separate sequential time periods, since each local repeater 30 only looks at the priority of the winning boards of the associated cluster.

We claim:

1. A method of providing contention for the sequential transmission of packets of information between a plurality of circuit boards of a communication network, the plurality of circuit boards being formed in at least one cluster of M circuit boards each, the method comprising the steps of:
   (a) selectively assigning one of a plurality of priority levels to each of the M circuit boards in each cluster; and
   during a selected time period, performing the steps of;
   (b) prior to any circuit board transmitting a packet of information, performing a first cluster contention phase by enabling all circuit boards within each cluster to provide information about both their readiness to transmit a packet of real data and their assigned priority level, and when at least one circuit board in a cluster has a packet of real data to transmit, the one or more circuit boards in each cluster having both (i) a packet of real data to transmit and (ii) a preassigned highest priority level among the circuit boards in the cluster with a packet of real data to transmit are declared as winners of the first cluster priority phase;
   (c) performing a second cluster contention phase by setting a pointer to point at a different one of the M circuit boards during each packet transmission period, and using the pointer for declaring the pointed-to circuit board within each cluster as the winner of the second cluster contention phase if that circuit board was included as a winner in step (b), and declaring a circuit board on a predetermined side of the pointed-to board as the winner of the second cluster contention phase when the pointed-to board was not included as a winner in step (b); and
   (d) transmitting a packet of information by the circuit board declared as a winner in step (c) to the plurality of circuit boards of the communication system during a subsequent packet transmission period while all of the other circuit boards contend again during a next 2-phase cluster contention procedure.

2. A method of contention in accordance with claim 1 wherein the method comprises the further steps of:
   (b1) in performing step (b), declaring all M circuit boards as winners of the first cluster contention phase when none of the M circuit boards have a packet of real data to transmit; and
   (b1transmitting a dead-space packet by the circuit board pointed to in step (c) in response to the performance of steps (b1) and (c), the dead-space packet comprising a predetermined bit configuration sequence.

3. A method of contention according to claim 1 or 2 wherein in performing step (d), adding an error detecting code to each packet of information before the packet is transmitted to the plurality of circuit boards to effect error detection and fault isolation in the network.

4. A method of contention according to claim 1 or 2 wherein in performing step (d), encoding each packet of information to be transmitted to the plurality of circuit boards with a code that ensures a predetermined number of transitions and average power level in the signals of the packet to maintain a substantially constant duty cycle of an A-C coupled receiver device connected in the network.

5. A method according to claim 1 or 2 wherein the network includes a plurality of N clusters of M circuit boards each, where each cluster of M circuit boards is connected to a separate one of a plurality of N local repeaters, the plurality of N local repeaters being connected to a master repeater via a multi-tap optical or electrical interconnect means, where the master repeater transmits each packet of information received from the local repeaters back to the plurality of $N \times M$ circuit boards, the method including the further steps of:
   (e) after performing steps (b) and (c) and before performing step (d), performing a first repeater contention phase wherein the repeaters associated with all circuit boards declared as winners in step (c) with both (i) a packet of real data ready to transmit and (ii) a preassigned highest priority level declare themselves as winners of the first repeater contention phase;
   (f) performing a second repeater contention phase by setting a pointer to point at a different one of the N repeaters during each sequential packet transmission period, the point-to local repeater declares itself as the winner of the second repeater contention phase if that repeater was included as a winner in step (e), and a selective repeater on a predetermined side of the pointed-to repeater declares itself as the overall winner of the second repeater contention phase when the pointed-to repeater was not included as a winner in step (e); and
   in performing step (d), enabling the circuit board declared as the overall winner in step (f) to transmit its packet of information during the subsequent packet transmission period, and informing the other non-winners of the second cluster contention phase in each of the $N-1$ clusters that their packets are not be transmitted and that such non-winning circuit boards should send a dead-space packet and content again during the next packet transmission period.

6. A method according to claim 5 wherein in performing step (d) adding an error detecting code to each packet of information before the packet is transmitted via the local repeater and the master repeater to each of the N×M circuit boards to effort error detection and fault isolation in the network.

7. A method according to claim 5 wherein in performing step (d), encoding each packet of information to be transmitted via the winning circuit board, the winning local repeater and the master repeater with a code that ensures a predetermined number of transitions and average power level in the signals of the packet of information to maintain a substantially constant duty cycle of an A-C coupled receive device connected in the system.

8. A contention mechanism for implementing a contention procedure between a plurality of M circuit boards in each of a plurality of N clusters of circuit boards, where $N \geq 1$ and each circuit board in each cluster is assigned a predetermined one of X priority levels and $X > 1$, the contention mechanism comprising:

(a) means for implementing a first cluster contention phase including (1) means for transmitting predetermined code signals indicating the priority level of each circuit board in a cluster, and (2) means responsive to the code signals from the M circuit boards of each cluster to determined which of the M circuit boards in each cluster (i) have a packet of real data to transmit, and (ii) also have the highest priority of those circuit boards in each cluster having a packet of real data to transmit, and declaring such circuit boards as winners of the first cluster contention phase in each cluster, (b) means for implementing a second cluster contention phase, the second contention phase implementing means including (i) means for setting a pointer directed at a separate one of the M circuit boards of each cluster during each sequential packet transmission period, and (ii) means for declaring the pointed-to circuit board in each cluster as an overall winner of the second cluster contention phase when the pointed-to circuit board is included as a winner in the first contention phase, and for declaring a selective circuit board on a predetermined side of the pointed-to circuit board as the overall winner of the second cluster contention phase in a cluster when the pointed-to circuit board is not included as a winner in the first cluster contention phase, and (c) means responsive to the declaring means of the second cluster contention phase implementing means for enabling a transmitter of the circuit board declared as the overall winner of the second cluster contention phase in each cluster to transmit its packet during a subsequent packet transmission period.

9. A contention mechanism according to claim 8 wherein the first cluster contention phase determining and declaring means is also responsive to all of the plurality of M circuit boards of a cluster indicating by their code signals that they have no packet of real data ready to transmit for declaring all of the M circuit boards of that cluster as winners of the first contention phase, and the transmitter of the circuit board declared as the overall winner of the M circuit boards of that cluster by the second contention phase implementing means for transmitting a dead-space packet of information comprising a predetermined bit configuration during a predetermined subsequent packet transmission period.

10. A contention mechanism according to claim 8 or 9 wherein the transmitter of the circuit board declared as the overall winner of a cluster is arranged to transmit an error detecting code in each packet of information it transmits to effect error detection at a receiver receiving the packet of information and fault isolation in a network including the plurality of N clusters of M circuit boards each.

11. A contention mechanism according to claim 8 or 9 wherein the transmitting of the circuit board declared as the overall winner of the second cluster contention phase by the second cluster contention implementing and generating means includes means for encoding each packet of information to be transmitted with a code that ensures a predetermined number of transitions and an average power level in the signals of the packet to maintain a substantially constant duty level of an A-C coupled receive device connected to a network including the plurality of M circuit boards.

12. A contention mechanism according to claim 8 or 9 for use in a network comprising a plurality of N clusters of M circuit boards each where $N > 1$, the mechanism further comprising:

means for implementing a second 2-phase contention procedure between the circuit board winners of the second cluster contention phase in each of the N clusters, the second 2-phase contention implementing means comprising:

first contention means for implementing a first contention phase of the second 2-phase contention procedure, the first contention means including (a) means for determining which of each of the N winning circuit boards in the N clusters (i) have a packet of real data to transmit, and (ii) also have the highest priority to those circuit boards in the N clusters having a packet of real data to transmit, and (b) means for declaring such circuit boards from the N clusters as winners of first contention phase of the second 2-phase contention procedure; and second contention means responsive to an output from the declaring means of the first contention means for implementing a second contention phase of the second 2-phase contention procedure, the second contention means including (i) means for setting a pointer directed at a separate one of the N clusters during each sequential packet transmission period, and (ii) means for generating a first output signal which declares the winning circuit board in the pointed-to cluster as an overall winner of the second contention phase procedure or declares the circuit board of that cluster on a predetermined side of the pointed-to cluster as the overall winner of the second contention phase when the pointed-to cluster is not included as a winner in the first contention phase of the second 2-phase contention procedure; and means responsive to the first or second output signals from the generating means of the second contention means for causing the enabled transmitter from the second cluster contention phase implementing means and declared as the overall winner of the second contention phase of the second 2-phase contention procedure to transmit its packet during the subsequent packet transmission period.

13. A contention mechanism according to claim 12 wherein the first contention means is also responsive to all of the N clusters indicating that their overall winning circuit boards have no packet of real data to transmit for declaring that all of the N clusters are winners of the first contention phase of the second 2-phase contention procedure; and the circuit board declared as the winner in the second cluster contention phase in the cluster declared as the overall winner in the second 2-phase contention procedure will transit a dead-space packet of information when a second output signal is generated by the first contention means.

14. A contention mechanism according to claim 12 wherein a transmitter of the circuit board in the cluster declared as the overall winner of the second contention phase of the second 2-phase contention procedure is arranged to transmit an error detecting code in each packet of information it transmits to effect error detection at a receiver receiving the packet of information and also provide fault isolation in a network including the plurality of N×M circuit boards.

15. A contention mechanism according to claim 12 wherein a transmitter of the circuit board in the cluster declared as the overall winner of the second contention phase of the second 2-phase contention procedure includes means for encoding each packet of information to be transmitted with a code that ensures a predetermined number of transitions and an average power level in the signals of the packet of information to maintain a substantially constant duty level of an A-C coupled receive device connected to a network including the plurality of N×M circuit boards.

* * * * *

UNITED STATES PATENT AND TRADEMARK OFFICE
CERTIFICATE OF CORRECTION

PATENT NO. : 4,872,163

DATED : October 3, 1989

INVENTOR(S) : David R. Follett

It is certified that error appears in the above-identified patent and that said Letters Patent is hereby corrected as shown below:

Column 12, line 56, after "phase" insert --of the second 2-phase contention procedure when that cluster was included as a winner of the first contention phase of the second 2-phase contention--.

Column 12, line 14 change "transmitting" to read --transmitter--.

Signed and Sealed this

Twenty-eighth Day of January, 1992

Attest:

HARRY F. MANBECK, JR.

*Attesting Officer*     *Commissioner of Patents and Trademarks*